(12) United States Patent
    Zhang (10) Patent No.: US 11,754,887 B2
(45) Date of Patent: Sep. 12, 2023

(54) PIXEL ELECTRODE AND LIQUID CRYSTAL DISPLAY PANEL HAVING THE SAME

(71) Applicant: Shenzhen China Star Optoelectronics Semiconductor Display Technology Co., Ltd., Guangdong (CN)

(72) Inventor: Yinfeng Zhang, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 497 days.

(21) Appl. No.: 16/975,157

(22) PCT Filed: Jun. 5, 2020

(86) PCT No.: PCT/CN2020/094632
    § 371 (c)(1),
    (2) Date: Aug. 24, 2020

(87) PCT Pub. No.: WO2021/208213
    PCT Pub. Date: Oct. 21, 2021

(65) Prior Publication Data
    US 2023/0096799 A1    Mar. 30, 2023

(30) Foreign Application Priority Data
    Apr. 14, 2020 (CN) .......................... 202010289090.6

(51) Int. Cl.
    *G02F 1/1343* (2006.01)
    *G02F 1/1368* (2006.01)

(52) U.S. Cl.
    CPC ...... *G02F 1/134318* (2021.01); *G02F 1/1368* (2013.01); *G02F 1/13439* (2013.01); *G02F 2201/123* (2013.01)

(58) Field of Classification Search
    CPC ............. G02F 1/1335; G02F 1/133514; G02F 1/1343; G02F 1/134309; G02F 1/134318; G02F 1/13439; G02F 1/1362; G02F 1/136286; G02F 1/1368; G02F 2201/123
    See application file for complete search history.

(56) References Cited

U.S. PATENT DOCUMENTS

2011/0149224 A1    6/2011  Tseng et al.
2012/0002148 A1*   1/2012  Pai .................... G02F 1/133711
                                                              349/117
(Continued)

FOREIGN PATENT DOCUMENTS

CN    202150001    2/2012
CN    102662280    9/2012
CN    107367873    11/2017
(Continued)

*Primary Examiner* — Thoi V Duong (57) ABSTRACT

A pixel electrode is provided. A plurality of sub-trunks of a vertical trunk of the pixel electrode are spaced apart from each other. Each of the sub-trunks is parallel to a horizontal trunk. Therefore, liquid crystal molecules on each sub-trunk is basically inclined in a horizontal direction. If the pixel electrode with the above structure is applied to a liquid crystal display panel, a color shift generated by the liquid crystal display panel when displaying skin-tone colors can be improved, and quality of the display can be improved. A liquid crystal display panel having the pixel electrode is also provided.

14 Claims, 6 Drawing Sheets

(56) References Cited

U.S. PATENT DOCUMENTS

2013/0285891 A1 10/2013 Zhang
2019/0086743 A1 3/2019 Ye

FOREIGN PATENT DOCUMENTS

| CN | 108828852 | 11/2018 |
| CN | 109581760 | 4/2019 |
| CN | 109709729 | 5/2019 |
| JP | 2011-158653 | 8/2011 |

\* cited by examiner

PIXEL ELECTRODE AND LIQUID CRYSTAL DISPLAY PANEL HAVING THE SAME

RELATED APPLICATIONS

This application is a National Phase of PCT Patent Application No. PCT/CN2020/094632 having International filing date of Jun. 5, 2020, which claims the benefit of priority of Chinese Patent Application No. 202010289090.6 filed on Apr. 14, 2020. The contents of the above applications are all incorporated by reference as if fully set forth herein in their entirety.

FIELD AND BACKGROUND OF THE INVENTION

The present disclosure relates to the field of display technologies, and in particular, to a pixel electrode and a liquid crystal display panel having the same.

In the field of display technologies, liquid crystal display (LCD) devices have been widely used due to their many advantages such as compact construction, low power consumption, and no radiation. Most LCD devices in an existing market are backlight type LCD devices. The backlight type LCD device includes an LCD panel and a backlight module. The LCD panel is usually composed of a thin film transistor (TFT) array substrate, a color filter (CF) substrate, and a liquid crystal layer disposed between the TFT array substrate and the CF substrate. An operation principle of the LCD panel is to control a deflection of liquid crystal molecules of the liquid crystal layer by applying voltage to a pixel electrode of the TFT array substrate and a common electrode of the CF substrate, and then a light of the backlight module is refracted to generate an image.

The pixel electrode in an existing vertical alignment (VA) LCD panel generally adopts a cross-shaped trunk structure. However, as a resolution of VA type LCD panels is further improved, pixel refinement causes a sharp increase in a proportion of the cross-shaped trunk. In the cross-shaped trunk, the liquid crystal molecules on the vertical trunk arranged along a vertical direction incline in the vertical direction, which causes the VA type LCD panel to have a serious color shift when displaying skin-tone colors, which reduces quality of the display.

SUMMARY OF THE INVENTION

The present disclosure provides a pixel electrode and a liquid crystal display panel having the same, to solve the problems of a serious color shift when displaying skin-tone colors and low quality of the display in an existing VA-type LCD panel.

In a first aspect, the present disclosure provides a pixel electrode. The pixel electrode includes a cross-shaped trunk and a plurality of branches. The plurality of branches are respectively disposed in four regions defined by the cross-shaped trunk, the cross-shaped trunk includes a horizontal trunk arranged along a horizontal direction and a vertical trunk arranged along a vertical direction. The vertical trunk includes a plurality of sub-trunks which are separated from each other, some of the branches in each of the regions are respectively connected to corresponding sub-trunks, and remaining branches are connected to the horizontal trunk In some embodiments, the horizontal trunk is in a strip shape, and the sub-trunks are in the strip shape and are parallel to the horizontal trunk.

In some embodiments, the plurality of branches in the same region are spaced apart and parallel to each other.

In some embodiments, the four regions are a first region, a second region, a third region, and a fourth region in the clockwise direction.

An arrangement of the branches in the first region and an arrangement of the branches in the second region are symmetrical with respect to the horizontal trunk, the arrangement of the branches in the second region and an arrangement of the branches in the third region are symmetrical with respect to the vertical trunk, the arrangement of the branches in the third region and an arrangement of the branches in the fourth region are symmetrical with respect to the horizontal trunk, and the arrangement of the branches in the fourth region and the arrangement of the branches in the first region are symmetrical with respect to the vertical trunk.

In some embodiments, the pixel electrode further includes:
a border including a first bending edge and a second bending edge.

The first bending edge is disposed outside the second region, and a portion of the branches in the second region is connected to the first bending edge.

The second bending edge is disposed outside the fourth region, and a portion of the branches in the fourth region is connected to the second bending edge.

In some embodiments, the border further includes:
a first vertical edge and a second vertical edge.

The first vertical edge is disposed on a side of the first region away from the vertical trunk, the first vertical edge includes a plurality of first point edges which are spaced apart from each other, the branches in the first region are correspondingly connected to the first point edges.

The second vertical edge is disposed on a side of the third region away from the vertical trunk, the second vertical edge includes a plurality of second point edges which are spaced apart from each other, and the branches in the third region are correspondingly connected to the second point edges.

In some embodiments, the branches in the second region except to that connected with the first bending edge are correspondingly connected to the first point edges, and the branches in the fourth region except to that connected with the second bending edge are correspondingly connected to the second point edges.

In some embodiments, shapes of the first point edges and the second point edges include rectangular, triangular, and semicircular.

In some embodiments, the pixel electrode further includes:
a connecting part disposed on a side of the first region away from the second region. The connecting part is connected to the branches in the first region.

In a second aspect, the present disclosure provides a liquid crystal display panel. The liquid crystal display panel includes a first substrate, a second substrate opposite to the first substrate, a first electrode disposed on a surface of the first substrate facing the second substrate, a second electrode disposed on a surface of the second substrate facing the first substrate, and a liquid crystal layer disposed between the first electrode and the second electrode. The first substrate is a thin film transistor array substrate, the second substrate is a color filter substrate, and the second electrode is a common electrode. The first electrode is a pixel electrode, the pixel electrode includes a cross-shaped trunk and a plurality of branches, the plurality of branches are respectively provided in four regions defined by the cross-shaped trunk, and the cross-shaped trunk includes a horizontal trunk arranged along a horizontal direction and a vertical trunk arranged along a vertical direction, the vertical trunk includes a plurality of sub-trunks which are spaced apart from each other, some of the branches in each of the regions are respectively connected to corresponding sub-trunks, and remaining branches are connected to the horizontal trunk.

In some embodiments, the horizontal trunk is in a strip shape, and the sub-trunks are in the strip shape and are parallel to the horizontal trunk.

In some embodiments, the plurality of branches in the same region are spaced apart and parallel to each other.

In some embodiments, the four regions are a first region, a second region, a third region, and a fourth region in the clockwise direction.

An arrangement of the branches in the first region and an arrangement of the branches in the second region are symmetrical with respect to the horizontal trunk, the arrangement of the branches in the second region and an arrangement of the branches in the third region are symmetrical with respect to the vertical trunk, the arrangement of the branches in the third region and an arrangement of the branches in the fourth region are symmetrical with respect to the horizontal trunk, and the arrangement of the branches in the fourth region and the arrangement of the branches in the first region are symmetrical with respect to the vertical trunk.

In some embodiments, the liquid crystal display panel further includes:

a border including a first bending edge and a second bending edge.

The first bending edge is disposed outside the second region, and a portion of the branches in the second region is connected to the first bending edge.

The second bending edge is disposed outside the fourth region, and a portion of the branches in the fourth region is connected to the second bending edge.

In some embodiments, the border further includes:

a first vertical edge and a second vertical edge.

The first vertical edge is disposed on a side of the first region away from the vertical trunk, the first vertical edge includes a plurality of first point edges which are spaced apart from each other, the branches in the first region are correspondingly connected to the first point edges.

The second vertical edge is disposed on a side of the third region away from the vertical trunk, the second vertical edge includes a plurality of second point edges which are spaced apart from each other, and the branches in the third region are correspondingly connected to the second point edges.

In some embodiments, the branches in the second region except to that connected to the first bending edge are correspondingly connected to the first point edges, and the branches in the fourth region except to that connected with the second bending edge are correspondingly connected to the second point edges.

In some embodiments, shapes of the first point edges and the second point edges include rectangular, triangular, and semicircular.

In some embodiments, the pixel electrode further includes:

a connecting part disposed on a side of the first region away from the second region. The connecting part is connected to the branches in the first region.

In some embodiments, the thin film transistor array substrate includes a gate line extending along the horizontal direction, a data line extending along the vertical direction, and a switching thin film transistor, and a gate of the switching thin film transistor is connected to the gate line, a source of the switching thin film transistor is connected to the data line, and a drain of the switching thin film transistor is connected to the pixel electrode.

In some embodiments, the liquid crystal display panel is a vertical alignment type liquid crystal display panel.

In the pixel electrode of the present disclosure, because the plurality of sub-trunks of the vertical trunk are spaced apart from each other, and each of the sub-trunks is parallel or approximately parallel to the horizontal trunk, liquid crystal molecules on each of the sub-trunks basically incline in the horizontal direction. If the pixel electrode having the above structure is applied to a VA type LCD panel, a color shift generated when the VA type LCD panel displays skin-tone colors can be improved, and quality of the display can be improved.

DESCRIPTION OF SPECIFIC EMBODIMENTS OF THE INVENTION

To make a purpose, technical solutions, and effects of the present disclosure clearer and more definite, the present disclosure will be described in further detail below with reference to the accompanying drawings and embodiments. It should be understood that the specific embodiments described herein are only used to explain the present disclosure, and are not used to limit the present disclosure.

Figure 1:
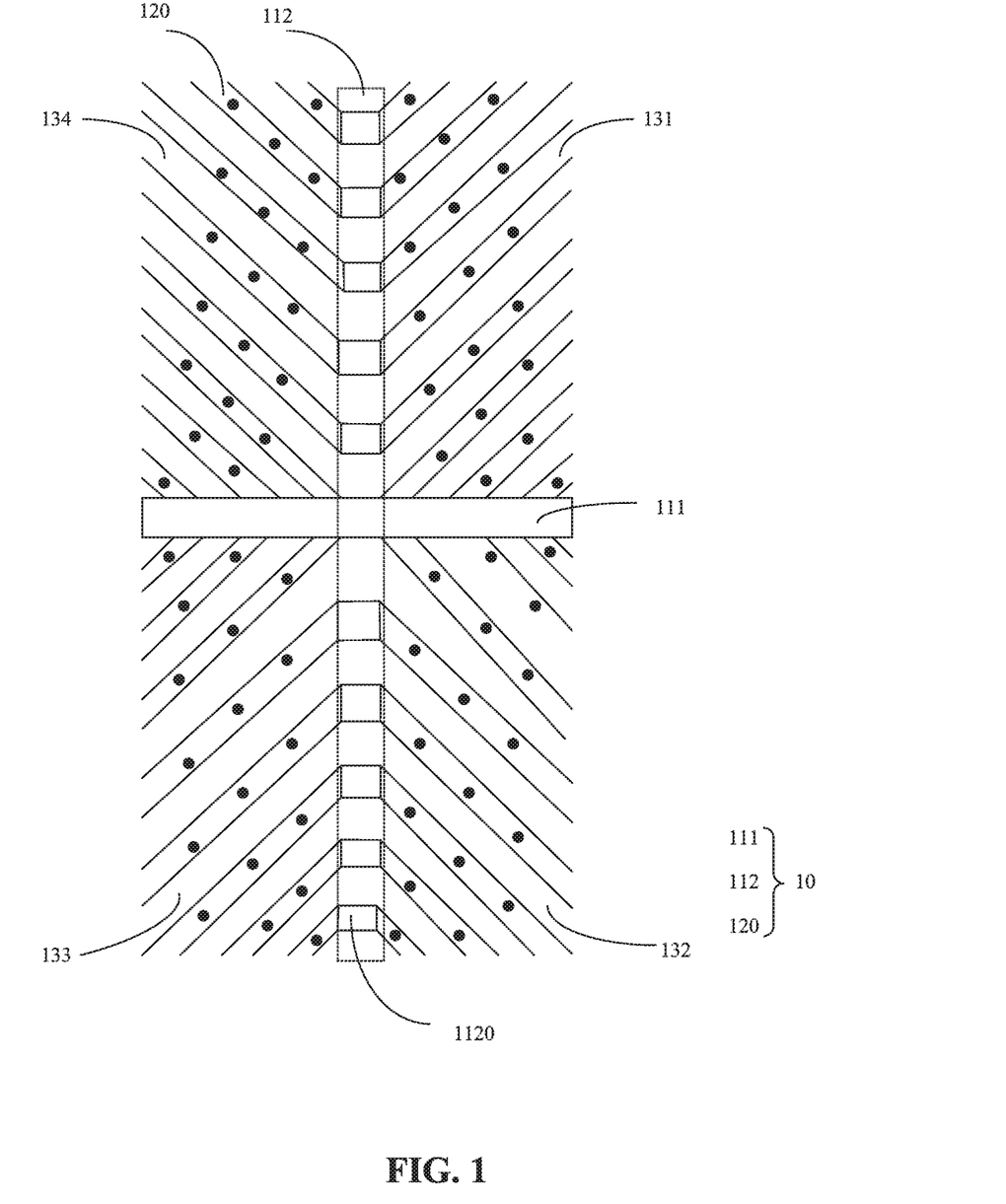
FIG. 1 is a schematic diagram of a pixel electrode of an embodiment of the present disclosure.

FIG. 1 is a schematic diagram of a pixel electrode of an embodiment of the present disclosure. As shown in FIG. 1, a pixel electrode 10 includes a cross-shaped trunk and a plurality of branches 120. The branches 120 are respectively disposed in four regions defined by the cross-shaped trunk. The cross-shaped trunk includes a horizontal trunk 111 arranged along a horizontal direction and a vertical trunk 112 arranged along a vertical direction.

The vertical trunk 112 includes a plurality of sub-trunks 1120 which are spaced apart from each other.

Some of the branches 120 in each of the regions are respectively connected to corresponding sub-trunks 1120, and remaining branches 120 are connected to the horizontal trunk 111.

It should be noted that each of the sub-trunks 1120 may be arranged parallel to the horizontal trunk 111, or may be inclined at a small angle with respect to the horizontal trunk 111, which is not specifically limited in the embodiments of the present disclosure.

It can be understood that, since some sub-trunks 1120 of the vertical trunk 112 are spaced apart from each other, and each sub-trunk 1120 is parallel or approximately parallel to the horizontal trunk 111, liquid crystal molecules on each sub-trunk 1120 basically incline in the horizontal direction. If the pixel electrode 10 having the above structure is applied to a VA type LCD panel, a color shift generated when the VA type LCD panel displays skin-tone colors can be improved, and quality of the display can be improved.

In some embodiments, as shown in FIG. 1, the horizontal trunk 111 is in a strip shape, and each of the sub-trunks 1120 is in the strip shape and is parallel to the horizontal trunk.

It can be understood that, since some sub-trunks 1120 of the vertical trunk 112 are spaced apart from each other, and each sub-trunk 1120 is parallel to the horizontal trunk 111, liquid crystal molecules on each sub-trunk 1120 incline in the horizontal direction. If the pixel electrode 10 having the above structure is applied to a VA type LCD panel, a color shift generated when the VA type LCD panel displays skin-tone colors can be improved, and quality of the display can be improved.

In some embodiments, as shown in FIG. 1, the plurality of branches 120 in the same region are spaced apart and parallel to each other.

In some embodiments, as shown in FIG. 1, the four regions are a first region 131, a second region 132, a third region 133, and a fourth region 134 in the clockwise direction. An arrangement of the branches 120 in the first region 131 and an arrangement of the branches 120 in the second region 132 are symmetrical with respect to the horizontal trunk 111. The arrangement of the branches 120 in the second region 132 and an arrangement of the branches 120 in the third region 133 are symmetrical with respect to the vertical trunk 112. The arrangement of the branches 120 in the third region 133 and an arrangement of the branches 120 in the fourth region 134 are symmetrical with respect to the horizontal trunk 111. The arrangement of the branches 120 in the fourth region 134 and the arrangement of the branches 120 in the first region 131 are symmetrical with respect to the vertical trunk 112.

Figure 2:
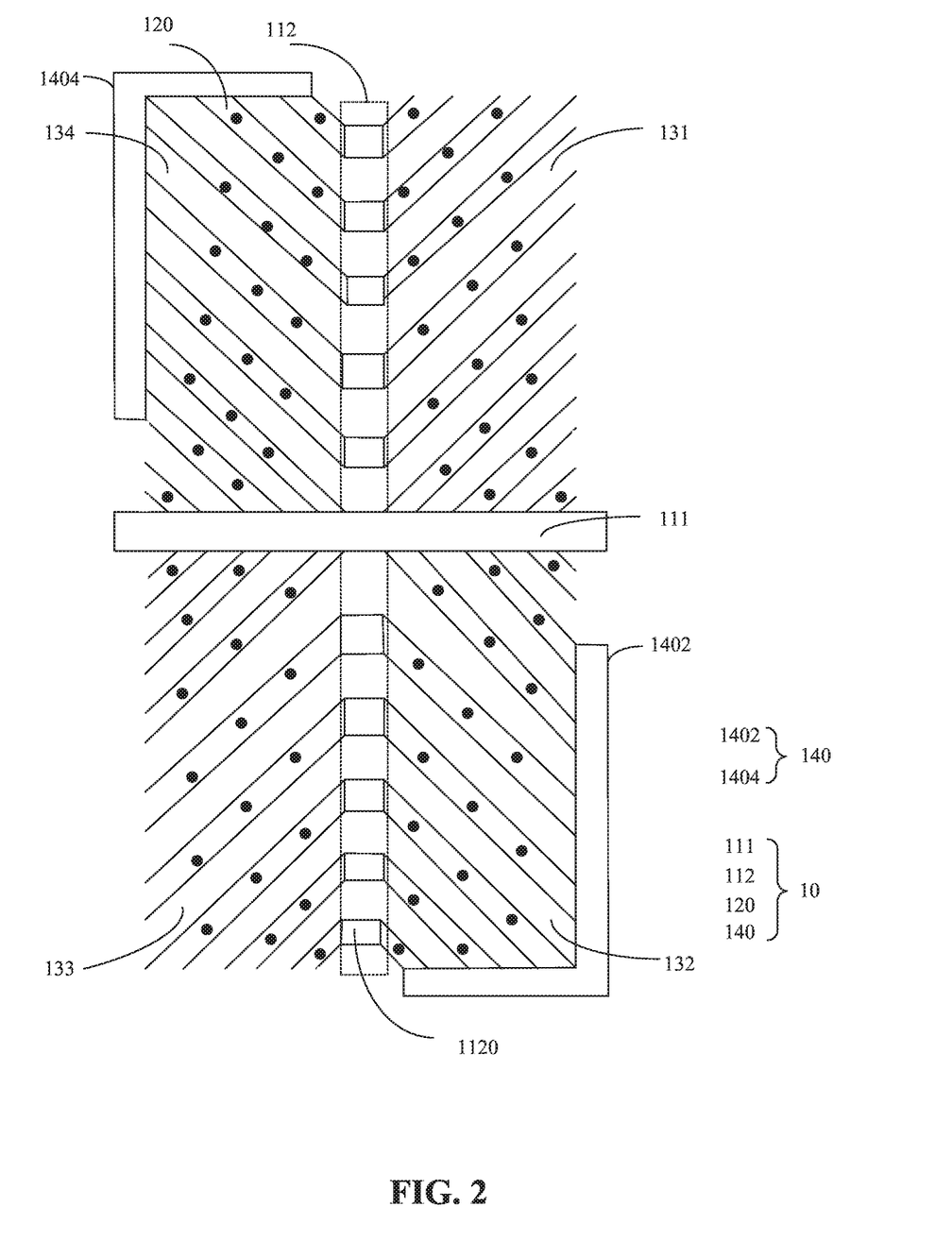
FIG. 2 is a schematic diagram of a pixel electrode of another embodiment of the present disclosure.

FIG. 2 is a schematic diagram of a pixel electrode of another embodiment of the present disclosure.

As shown in FIG. 2, the pixel electrode 10 further includes a border 140. The border 140 includes a first bending edge 1402 and a second bending edge 1404.

The first bending edge 1402 is disposed outside the second region 132, and a portion of the branches 120 in the second region 132 is connected to the first bending edge 1402. Specifically, the first bending edge 1402 includes two strips which are connected perpendicularly to each other, all the branches 120 connected to the sub-trunks 1120 in the second region 132 and at least one branch 120 connected to the horizontal trunk 111 are connected to the first bending edge 1402.

The second bending edge 1404 is disposed outside the fourth region 134, and a portion of the branches 120 in the fourth region 134 is connected to the second bending edge 1404. Specifically, the second bending edge 1404 includes two strips which are connected perpendicularly to each other, all the branches 120 connected to the sub-trunks 1120 in the fourth region 134 and at least one branch 120 connected to the horizontal trunk 111 are connected to the second bending edge 1404.

Figure 3:
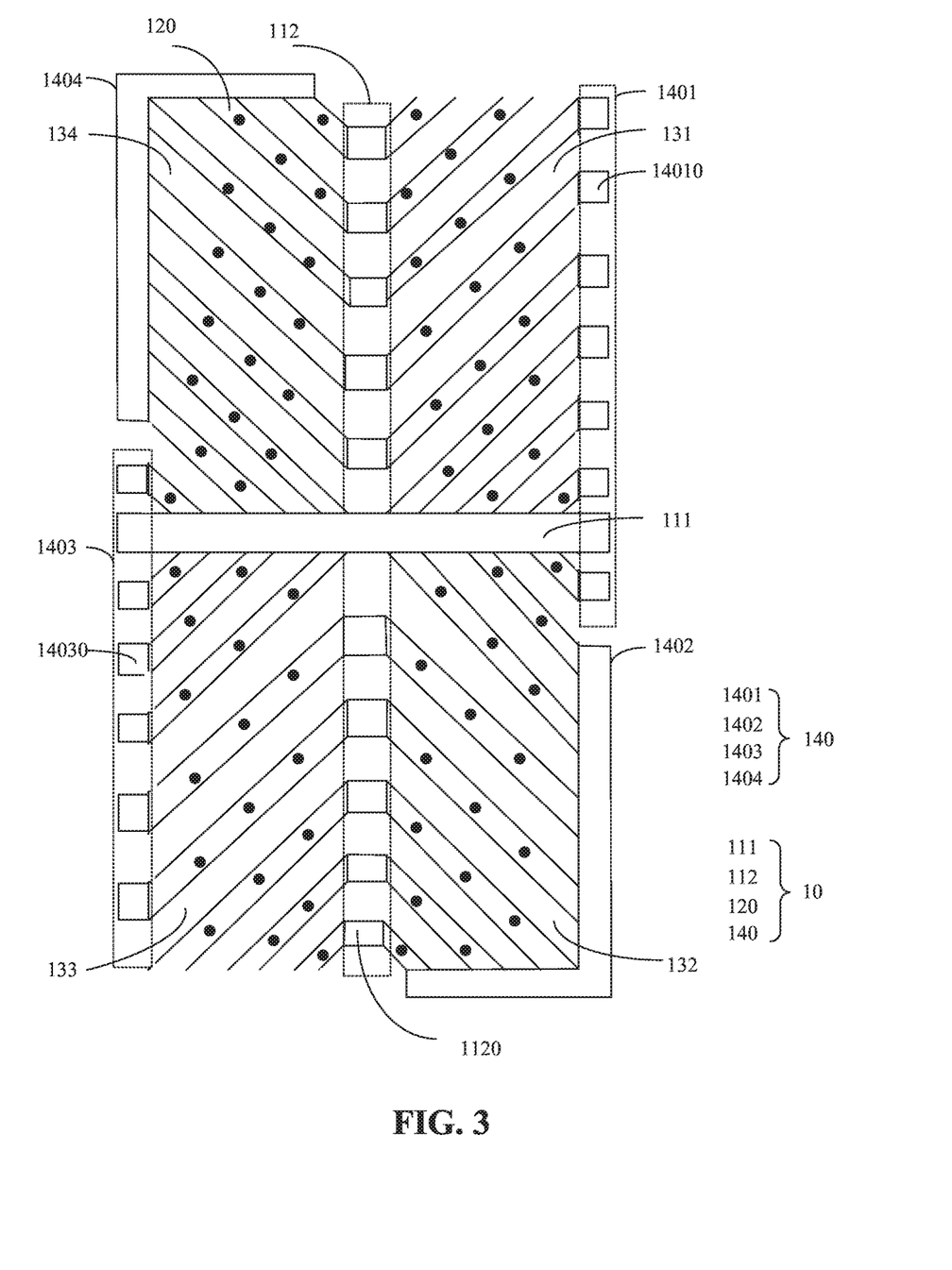
FIG. 3 is a schematic diagram of a pixel electrode of another embodiment of the present disclosure.

FIG. 3 is a schematic diagram of a pixel electrode of another embodiment of the present disclosure.

As shown in FIG. 3, the border 140 further includes a first vertical edge 1401 and a second vertical edge 1403.

The first vertical edge 1401 is disposed on a side of the first region 131 away from the vertical trunk 112, the first vertical edge 1401 includes a plurality of first point edges 14010 which are spaced apart from each other, the branches 120 in the first region 131 are correspondingly connected to the first point edges 14010.

The second vertical edge 1403 is disposed on a side of the third region 133 away from the vertical trunk 112, the second vertical edge 1403 includes a plurality of second point edges 14030 which are spaced apart from each other, and the branches 120 in the third region 133 are correspondingly connected to the second point edges 14030.

In some embodiments, as shown in FIG. 3, the branches 120 in the second region 132 except to that connected to the first bending edge 1402 are correspondingly connected to the first point edges 14010, and the branches 120 in the fourth region 134 except to that connected with the second bending edge 1404 are correspondingly connected to the second point edges 14030.

In some embodiments, shapes of the first point edges 14010 and the second point edges 14030 may be the same or different. The first point edges 14010 may be rectangular, triangular, or semi-circular, and the second point edges 14030 may be rectangular, triangular, or semi-circular. It should be noted that the first point edges 14010 and the second point edges 14030 may be other shapes, which is not specifically limited in these embodiments.

The shapes of the first point edges 14010 and the second point edges 14030 shown in FIG. 3 are both rectangular.

Figure 4:
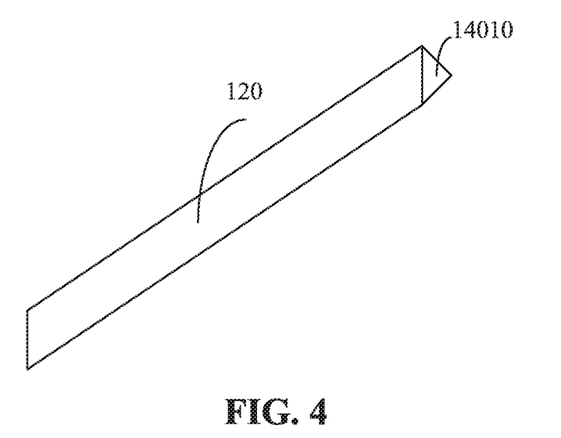
FIG. 4 is a schematic diagram showing a connection between branches and first point edges of an embodiment of the present disclosure.

FIG. 4 is a schematic diagram showing a connection between branches and first point edges of an embodiment of the present disclosure. As shown in FIG. 4, a shape of first point edges 14010 is a triangle.

Figure 5:
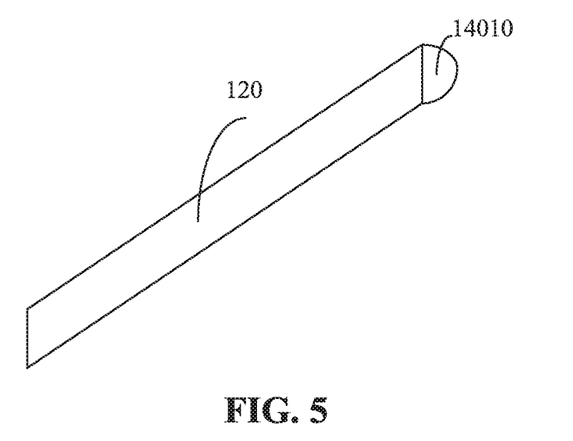
FIG. 5 is a schematic diagram showing a connection between branches and first point edges of another embodiment of the present disclosure.

FIG. 5 is a schematic diagram showing a connection between branches and first point edges of another embodiment of the present disclosure. As shown in FIG. 5, a shape of first point edges 14010 is a semicircle.

It can be understood that the above-mentioned point edges having a specific shape at the edges of the pixel electrode 10 can guide liquid crystal molecules thereon to incline in substantially the same or completely the same direction as the liquid crystal molecules on the branches 120. If the pixel electrode 10 is applied to a VA type LCD panel, it can reduce dark lines at edges of the VA type LCD panel and increase a penetration rate, thereby improving quality of the display. In addition, an improvement of the incline direction of the edges of the liquid crystal molecules (the liquid crystal molecules on the point edges) will significantly reduce a difference between left and right viewing angles and a front view under a large viewing angle, thereby effectively improving the color shift generated by the VA LCD panel when displaying skin-tone colors, and improving the quality of the display.

Figure 6:
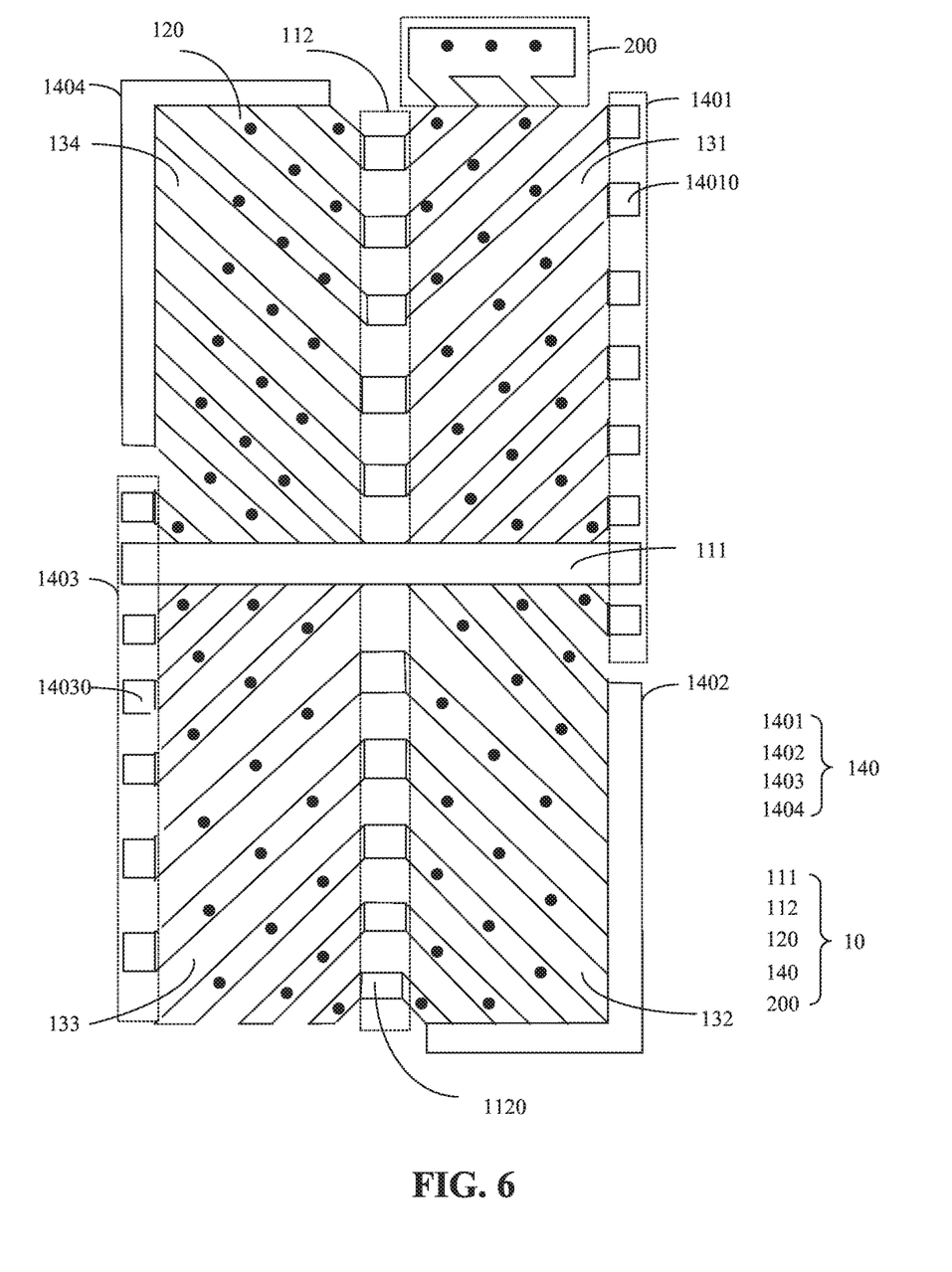
FIG. 6 is a schematic diagram showing a connection between branches and first point edges of another embodiment of the present disclosure.

FIG. 6 is a schematic diagram showing a connection between branches and first point edges of another embodiment of the present disclosure. As shown in FIG. 6, the pixel electrode 10 further includes a connecting part 200. The connecting part 200 is disposed on a side of the first region 131 away from the second region 132, and the connecting part 200 is connected to the branches 120 in the first region 131.

It should be noted that the horizontal trunk 111, the vertical trunk 112, the plurality of branches 120, the border 140, and the connecting part 200 in the pixel electrode 10 are made of indium tin oxide.

Figure 7:
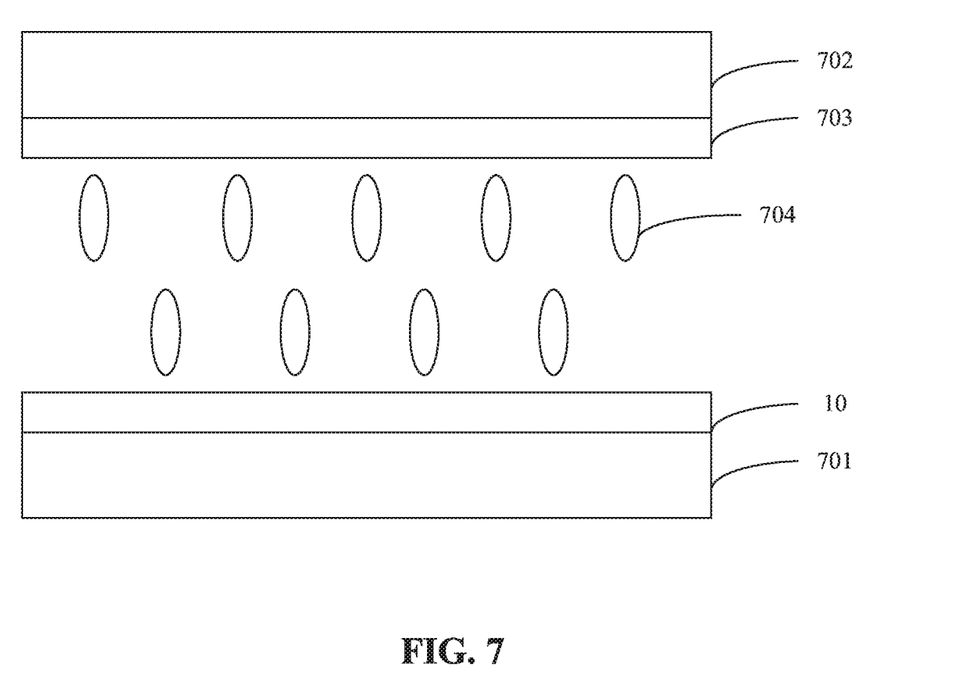
FIG. 7 is a schematic diagram of a liquid crystal display panel of an embodiment of the present disclosure.

FIG. 7 is a schematic diagram of a liquid crystal display panel of an embodiment of the present disclosure.

As shown in FIG. 7, the LCD panel includes a first substrate, a second substrate, a first electrode, a second electrode, and a liquid crystal layer 704. The first substrate is a thin film transistor array substrate 701. The second substrate is arranged opposite to the thin film transistor array substrate 701. The second substrate is a color filter substrate 702. The first electrode is disposed on a surface of the thin film transistor array substrate 701 facing the color filter substrate 702. The first electrode is the pixel electrode 10. The second electrode is disposed on a surface of the color filter substrate 702 facing the thin film transistor array substrate 701. The second electrode is a common electrode 703. The liquid crystal layer 704 is disposed between the thin film transistor array substrate 701 and the color filter substrate 702.

As shown in FIG. 1, the pixel electrode 10 includes the cross-shaped trunk and the plurality of branches 120 which are respectively disposed in the four regions defined by the cross-shaped trunk. The cross-shaped trunk includes the horizontal trunk 111 arranged along the horizontal direction and the vertical trunk 112 arranged along the vertical direction.

The vertical trunk 112 includes the plurality of sub-trunks 1120 which are spaced apart from each other.

Some of the branches 120 in each of the regions are respectively connected to corresponding sub-trunks 1120, and remaining branches 120 are connected to the horizontal trunk 111.

It should be noted that each of the sub-trunks 1120 may be arranged parallel to the horizontal trunk 111, or may be inclined at a small angle with respect to the horizontal trunk 111, which is not specifically limited in the embodiments of the present disclosure.

It can be understood that, since some sub-trunks 1120 of the vertical trunk 112 are spaced apart from each other, and each sub-trunk 1120 is parallel or approximately parallel to the horizontal trunk 111, liquid crystal molecules on each sub-trunk 1120 basically incline in the horizontal direction. If the pixel electrode 10 having the above structure is applied to a VA type LCD panel, a color shift generated when the VA type LCD panel displays skin-tone colors can be improved, and quality of the display can be improved.

In some embodiments, as shown in FIG. 1, the horizontal trunk 111 is in a strip shape, and each of the sub-trunks 1120 is in the strip shape and is parallel to the horizontal trunk.

It can be understood that, since some sub-trunks 1120 of the vertical trunk 112 are spaced apart from each other, and each sub-trunk 1120 is parallel to the horizontal trunk 111, liquid crystal molecules on each sub-trunk 1120 incline in the horizontal direction. If the pixel electrode 10 having the above structure is applied to a VA type LCD panel, a color shift generated when the VA type LCD panel displays skin-tone colors can be improved, and quality of the display can be improved.

In some embodiments, as shown in FIG. 1, the plurality of branches 120 in the same region are spaced apart and parallel to each other.

In some embodiments, as shown in FIG. 1, the four regions are the first region 131, the second region 132, the third region 133, and the fourth region 134 in the clockwise direction. An arrangement of the branches 120 in the first region 131 and an arrangement of the branches 120 in the second region 132 are symmetrical with respect to the horizontal trunk 111. The arrangement of the branches 120 in the second region 132 and an arrangement of the branches 120 in the third region 133 are symmetrical with respect to the vertical trunk 112. The arrangement of the branches 120 in the third region 133 and an arrangement of the branches 120 in the fourth region 134 are symmetrical with respect to the horizontal trunk 111. The arrangement of the branches 120 in the fourth region 134 and the arrangement of the branches 120 in the first region 131 are symmetrical with respect to the vertical trunk 112.

In some embodiments, as shown in FIG. 2, the pixel electrode 10 further includes a border 140.

The border 140 includes the first bending edge 1402 and the second bending edge 1404.

The first bending edge 1402 is disposed outside the second region 132, and a portion of the branches 120 in the second region 132 is connected to the first bending edge 1402. Specifically, the first bending edge 1402 includes two strips which are connected perpendicularly to each other, all the branches 120 connected to the sub-trunks 1120 in the second region 132 and at least one branch 120 connected to the horizontal trunk 111 are connected to the first bending edge 1402.

The second bending edge 1404 is disposed outside the fourth region 134, and a portion of the branches 120 in the fourth region 134 is connected to the second bending edge 1404. Specifically, the second bending edge 1404 includes two strips which are connected perpendicularly to each other, all the branches 120 connected to the sub-trunks 1120 in the fourth region 134 and at least one branch 120 connected to the horizontal trunk 111 are connected to the second bending edge 1404.

In some embodiments, as shown in FIG. 3, the border 140 further includes:

the first vertical edge 1401 and the second vertical edge 1403.

The first vertical edge 1401 is disposed on a side of the first region 131 away from the vertical trunk 112, the first vertical edge 1401 includes a plurality of first point edges 14010 which are spaced apart from each other, the branches 120 in the first region 131 are correspondingly connected to the first point edges 14010.

The second vertical edge 1403 is disposed on a side of the third region 133 away from the vertical trunk 112, the second vertical edge 1403 includes a plurality of second point edges 14030 which are spaced apart from each other, and the branches 120 in the third region 133 are correspondingly connected to the second point edges 14030.

In some embodiments, as shown in FIG. 3, the branches 120 in the second region 132 except to that connected to the first bending edge 1402 are correspondingly connected to the first point edges 14010, and the branches 120 in the fourth region 134 except to that connected with the second bending edge 1404 are correspondingly connected to the second point edges 14030.

In some embodiments, shapes of the first point edges 14010 and the second point edges 14030 may be the same or different. The first point edges 14010 may be rectangular, triangular, or semi-circular, and the second point edges 14030 may be rectangular, triangular, or semi-circular. It should be noted that the first point edges 14010 and the second point edges 14030 may be other shapes, which is not specifically limited in these embodiments.

The shapes of the first point edges 14010 and the second point edges 14030 shown in FIG. 3 are both rectangular.

In some embodiments, as shown in FIG. 4, a shape of first point edges 14010 is a triangle.

In some embodiments, as shown in FIG. 5, a shape of first point edges 14010 is a semicircle.

It can be understood that the above-mentioned point edges having a specific shape at the edges of the pixel electrode 10 can guide liquid crystal molecules thereon to incline in substantially the same or completely the same direction as the liquid crystal molecules on the branches 120. If the pixel electrode 10 is applied to a VA type LCD panel, it can reduce dark lines at edges of the VA type LCD panel and increase a penetration rate, thereby improving quality of the display. In addition, an improvement of the incline direction of the edges of the liquid crystal molecules (the liquid crystal molecules on the point edges) will significantly reduce a difference between left and right viewing angles and a front view under a large viewing angle, thereby effectively improving the color shift generated by the VA LCD panel when displaying skin-tone colors, and improving the quality of the display.

In some embodiments, as shown in FIG. 6, the pixel electrode 10 further includes the connecting part 200. The connecting part 200 is disposed on a side of the first region 131 away from the second region 132, and the connecting part 200 is connected to the branches 120 in the first region 131.

In some embodiments, the thin film transistor array substrate 701 includes a gate line extending along the horizontal direction, a data line extending along the vertical direction, and a switching thin film transistor. A gate of the switching thin film transistor is connected to the gate line, a source of the switching thin film transistor is connected to the data line, and a drain of the switching thin film transistor is connected to the pixel electrode 10.

In some embodiments, the LCD panel may be a VA type LCD panel.

It can be understood that, for those of ordinary skill in the art, equivalent replacements or modifications can be made according to the technical solution of the present disclosure and its inventive concept, and all such replacements or modifications should belong to the protection of the present disclosure.

What is claimed is:

1. A pixel electrode, comprising: a cross-shaped trunk and a plurality of branches, wherein the plurality of branches are respectively disposed in four regions defined by the cross-shaped trunk, the cross-shaped trunk comprises a horizontal trunk arranged along a horizontal direction and a vertical trunk arranged along a vertical direction, wherein the vertical trunk comprises a plurality of sub-trunks which are separated from each other, some of the branches in each of the regions are respectively connected to corresponding sub-trunks, and remaining branches are connected to the horizontal trunk,
wherein the four regions are a first region, a second region, a third region, and a fourth region in the clockwise direction;
an arrangement of the branches in the first region and an arrangement of the branches in the second region are symmetrical with respect to the horizontal trunk, the arrangement of the branches in the second region and an arrangement of the branches in the third region are symmetrical with respect to the vertical trunk, the arrangement of the branches in the third region and an arrangement of the branches in the fourth region are symmetrical with respect to the horizontal trunk, and the arrangement of the branches in the fourth region and the arrangement of the branches in the first region are symmetrical with respect to the vertical trunk,
wherein the pixel electrode further comprises: a border comprising a first bending edge and a second bending edge;
wherein the first bending edge is disposed outside the second region, and a portion of the branches in the second region is connected to the first bending edge; and
the second bending edge is disposed outside the fourth region, and a portion of the branches in the fourth region is connected to the second bending edge,
wherein the border further comprises: a first vertical edge and a second vertical edge;
the first vertical edge is disposed on a side of the first region away from the vertical trunk, the first vertical edge comprises a plurality of first point edges which are spaced apart from each other, the branches in the first region are correspondingly connected to the first point edges; and
the second vertical edge is disposed on a side of the third region away from the vertical trunk, the second vertical edge comprises a plurality of second point edges which are spaced apart from each other, and the branches in the third region are correspondingly connected to the second point edges.

2. The pixel electrode as claimed in claim 1, wherein the horizontal trunk is in a strip shape, and the sub-trunks are in the strip shape and are parallel to the horizontal trunk.

3. The pixel electrode as claimed in claim 1, wherein the plurality of branches in the same region are spaced apart and parallel to each other.

4. The pixel electrode as claimed in claim 1, wherein the branches in the second region except to that connected with the first bending edge are correspondingly connected to the first point edges, and the branches in the fourth region except to that connected with the second bending edge are correspondingly connected to the second point edges.

5. The pixel electrode as claimed in claim 1, wherein shapes of the first point edges and the second point edges comprise rectangular, triangular, and semicircular.

6. The pixel electrode as claimed in claim 1, wherein the pixel electrode further comprises:
a connecting part disposed on a side of the first region away from the second region, wherein the connecting part is connected to the branches in the first region.

7. A liquid crystal display panel, comprising a first substrate, a second substrate opposite to the first substrate, a first electrode disposed on a surface of the first substrate facing the second substrate, a second electrode disposed on a surface of the second substrate facing the first substrate, and a liquid crystal layer disposed between the first electrode and the second electrode, wherein the first substrate is a thin film transistor array substrate, the second substrate is a color filter substrate, and the second electrode is a common electrode; and
wherein the first electrode is a pixel electrode, the pixel electrode comprises a cross-shaped trunk and a plurality of branches, the plurality of branches are respectively provided in four regions defined by the cross-shaped trunk, and the cross-shaped trunk comprises a horizontal trunk arranged along a horizontal direction and a vertical trunk arranged along a vertical direction, the vertical trunk comprises a plurality of sub-trunks which are spaced apart from each other, some of the branches in each of the regions are respectively connected to corresponding sub-trunks, and remaining branches are connected to the horizontal trunk,
wherein the four regions are a first region, a second region, a third region, and a fourth region in the clockwise direction;

an arrangement of the branches in the first region and an arrangement of the branches in the second region are symmetrical with respect to the horizontal trunk, the arrangement of the branches in the second region and an arrangement of the branches in the third region are symmetrical with respect to the vertical trunk, the arrangement of the branches in the third region and an arrangement of the branches in the fourth region are symmetrical with respect to the horizontal trunk, and the arrangement of the branches in the fourth region and the arrangement of the branches in the first region are symmetrical with respect to the vertical trunk, wherein the pixel electrode further comprises: a border comprising a first bending edge and a second bending edge;

wherein the first bending edge is disposed outside the second region, and a portion of the branches in the second region is connected to the first bending edge; and the second bending edge is disposed outside the fourth region, and a portion of the branches in the fourth region is connected to the second bending edge, wherein the border further comprises: a first vertical edge and a second vertical edge;

the first vertical edge is disposed on a side of the first region away from the vertical trunk, the first vertical edge comprises a plurality of first point edges which are spaced apart from each other, the branches in the first region are correspondingly connected to the first point edges; and the second vertical edge is disposed on a side of the third region away from the vertical trunk, the second vertical edge comprises a plurality of second point edges which are spaced apart from each other, and the branches in the third region are correspondingly connected to the second point edges.

8. The liquid crystal display panel as claimed in claim 7, wherein the horizontal trunk is in a strip shape, and the sub-trunks are in the strip shape and are parallel to the horizontal trunk.

9. The liquid crystal display panel as claimed in claim 7, wherein the plurality of branches in the same region are spaced apart and parallel to each other.

10. The liquid crystal display panel as claimed in claim 7, wherein the branches in the second region except to that connected to the first bending edge are correspondingly connected to the first point edges, and the branches in the fourth region except to that connected with the second bending edge are correspondingly connected to the second point edges.

11. The liquid crystal display panel as claimed in claim 7, wherein shapes of the first point edges and the second point edges comprise rectangular, triangular, and semicircular.

12. The liquid crystal display panel as claimed in claim 7, wherein the pixel electrode further comprises:

a connecting part disposed on a side of the first region away from the second region, wherein the connecting part is connected to the branches in the first region.

13. The liquid crystal display panel as claimed in claim 7, wherein the thin film transistor array substrate comprises a gate line extending along the horizontal direction, a data line extending along the vertical direction, and a switching thin film transistor, and a gate of the switching thin film transistor is connected to the gate line, a source of the switching thin film transistor is connected to the data line, and a drain of the switching thin film transistor is connected to the pixel electrode.

14. The liquid crystal display panel as claimed in claim 7, wherein the liquid crystal display panel is a vertical alignment type liquid crystal display panel.

\* \* \* \* \*